United States Patent [19]

Hamuro et al.

[11] 3,951,949

[45] Apr. 20, 1976

[54] SULFATES OF HYDROXYETHYL STARCH

[75] Inventors: Junji Hamuro, Tokyo; Yayoi Yoshinari, Kawasaki, both of Japan

[73] Assignee: Ajinomoto Co., Inc., Tokyo, Japan

[22] Filed: July 3, 1974

[21] Appl. No.: 485,724

[30] Foreign Application Priority Data

July 12, 1973 Japan................................ 48-77913

[52] U.S. Cl.......................... 260/233.3 R; 106/213; 260/999; 424/180
[51] Int. Cl.²..................... C08B 31/06; C08B 31/16
[58] Field of Search.................. 260/233.3 R, 233.5

[56] References Cited

UNITED STATES PATENTS 3,017,407   1/1962   Petracek et al.................. 260/233.5

*Primary Examiner*—Ronald W. Griffin
*Attorney, Agent, or Firm*—Cooper, Dunham, Clark, Griffin & Moran

[57] ABSTRACT

Sulfates of hydroxyethyl starch are useful as anti-inflammatory, anti-lipaemic, anti-arteriosclerosis, anti-ulcer or hypocholesterolic agents. They are manufactured by sulfation of hydroxyethyl starch.

3 Claims, No Drawings

SULFATES OF HYDROXYETHYL STARCH

This invention is concerned with novel sulfates of hydroxyethyl starch and metallic salts and complexes thereof having an average molecular weight in the range from 1,000 to 200,000, a degree of substitution of hydroxyethyl group of from 0.2 to 1.2 per anhydrous glucose unit, a sulfur content of from 2 to 18% by weight per weight of said sulfate of hydroxyethyl starch, and an intrinsic viscosity of said sulfate of from 0.02 to 0.5 at 30°C in water.

Sulfates of polysaccharides such as starch, oxidized starch, cellulose, xylan and dextran have been widely studied, and some of them have been found to have utility as anti-lipaemic agents. The use of such sulfates for therapeutic purposes has, however, been limited because of doubts as to clinical safety.

Additionally, their chemical synthesis is difficult because the polysaccharide tends to decompose under the reaction conditions.

It has been found that hydroxyethyl starch has pharmocological activity such as anti-inflammatory, anti-lipaemic, anti-arteriosclerosis, anti-ulcer or hypocholesterolic activity. Such activity however has not been observed with sulfates of such hydroxyethyl starch or of salts or metallic complexes thereof.

Hydroxyethyl starch is presently utilized as a plasma expander.

Hydroxyethyl starch used as the starting material of the present invention may be prepared, for example, by contacting waxy corn starch (amylopection content: over 98% by weight) with ethylene oxide or ethylene chlorohydrin. The degree of substitution of hydroxyethyl groups in the hydroxyethyl starch is preferably 0.2 to 1.2 per anhydrous glucose unit, more preferably 0.6 to 1.2 to avoid rapid decomposition in vivo.

The intrinsic viscosity of such hydroxyethyl starch at 30°C in water is 0.02 to 0.5.

The presently preferred methods for the preparation of the products of this invention will now be described. They comprise reaction between the starting material and either concentrated sulfuric acid or chlorosulfonic acid in pyridine.

In case reaction is effected by contact with concentrated sulfuric acid and if, for example, more than 70% sulfuric acid is used, a reaction temperature of lower than 0°C must be employed to limit discoloration. If more than 85% sulfuric acid is used, a reaction temperature of from −30°C and −25°C is preferred to limit the production of low molecular weight products. If such low molecular weight products are desired, reaction temperature of between −10° to 0°C will be employed. With 60% to 70% sulfuric acid a reaction temperature of from 0° and −30°C is preferably employed. Increased temperatures of about 0°C may be employed to increase the rate of reaction.

The selected hydroxyethyl starch is mixed with the above mentioned sulfuric acid in a ratio of at least about 20 g and up to about 50 g of such hydroxyethyl starch per 100 ml of total volume. The mixture is stirred at the selected temperature for from about 20 minutes and 4 hours.

At the end of the reaction period the mixture is poured into ice water, neutralized with, for example, $Na_2CO_3$ and filtered. The treatment with alkaline reagent is preferably effected promptly. The filtrate is concentrated to a concentration of from about 3 g to 20 g of products per 100 ml of volume suitably by use of "Diafilter" (trademark of Nippon Koshinku Co., Inc.) equipped with appropriate molecular weight membrane. The desired products are precipitated by the addition of a water miscible organic solvent such as methanol, ethanol or acetone. This procedure is quite effective and provides products of high purity.

In an alternative method of preparation calcium carbonate is added to the reaction mixture and insoluble $CaSO_4$ is removed. The sulfate of hydroxyethyl starch can be converted to the sodium salt by adding $Na_2CO_3$ to the solution containing sulfate of hydroxyethyl starch. The salt can be precipitated by the addition of an alkanol. This method is not preferred, however, because of the difficulty of removing inorganic materials.

Thus obtained reaction products are then washed, for example, with methanol and followed by acetone and ether, and then dried completely. Care should be taken that as much as possible of the calcium is replaced with sodium; otherwise the thus obtained sulfates of hydroxyethyl starch tend to decompose in a few days.

If the product is formed by reaction of hydroxyethyl starch with chlorosulfonic acid in pyridine, from about 0.5 to 3 moles of chlorosulfonic acid are used per anhydrous glucose unit of hydroxyethyl starch, and 3 to 10 ml of pyridine are used per gram of hydroxyethyl starch.

To carry out the reaction, pyridine is cooled to 0° to −20°C, and the chlorosulfonic acid is added dropwise while maintaining the temperature of the reaction solution below 10°C. The resulting solid pyridinium salt of chlorosulfonic acid is dissolved by warming at about 50° to 70°C, and to the dissolved pyridinium salt, the hydroxyethyl starch is added. The mixture is then stirred for from about 20 minutes to 2 hours.

The solubility of the hydroxyethyl starch in pyridine permits the sulfation reaction to proceed smoothly with no troublesome increase of viscosity.

At the end of the reaction, water is added to the mixture. The addition of an alcohol such as methanol in a volume ratio of 3 to 5 ml of methanol per 1 ml of the mixture precipitates the desired product as white powder. The powder is separated by filtration, washed and dried in the same manner as in the sulfuric acid procedure.

The precipitation of product can be improved by the addition of saturated, aqueous salt solution containing, for example, sodium acetate or sodium chloride. This procedure increases the rate of precipitation of product. The use of sodium acetate saturated aqueous solution is especially preferred.

The acid form of the sulfate may be converted to a wide variety of metallic salts or complexes by the addition of selected metal salts such as sodium carbonate, dihydroxy aluminum chloride and calcium dichloride, and the like. These metallic products have the same utilities as the free sulfates and are included within the scope of this invention. These include, for example, sodium, potassium, lithium, magnesium, calcium, barium, aluminum, iron and bismuth.

The sulfates of hydroxyethyl starch obtained in accordance with the process of this invention have a sulfur content of from about 2 to 18% and a low viscosity which makes them readily adaptable for the preparation of dosage unit forms.

The intrinsic viscosity of the sodium sulfate salts of this invention is from about 0.02 to 0.5 at 30°C. The average molecular weight is from about 1,000 to 200,000 (determined by gel permeation chromatography, Waters Associates ALC/GPL 501 in comparison with starndard dextran of several molecular weights). The molecular weight of the products of this invention will vary widely, depending on a variety of factors, principally the reaction conditions and the molecular weight of the starting materials. The active compositions have average molecular weights in the range of about 1,000 to 200,000.

The anti-coagulant activity of the products of this invention is about equal to that of heparin. A particular advantage is that they can be prepared at relatively low cost. They strongly inhibit both pepsin and hyaluronidase activity.

The products of this invention inhibit hemolysis of erythrocytes, accelerate erythrocyte sedimentation, and also inhibit heat denaturation of serum and food protein. They are useful as pharmaceutical agents, especially because of their anti-inflammatory, anti-lipaemic, anti-arteriosclerosis, anti-ulcer, and hypocholesterolic activity. They are also useful in the fields of food and chemical products.

Inhibition of heat denaturation of serum proteins is widely used for screening potential pharmaceutical agents for anti-inflammatory activity. The test is described in "Inhibition of Heat Denaturation of Serum Protein," Y. Mizushima, Arch. Int. Pharmacodyn. 149, 1 (1964).

In the test, the sodium salt of hydroxyethyl starch sulfate was dissolved in 1/15M phosphate suffer solution (PH=5.4) and to the solution the same phosphate buffer solution containing 1% bovine serum albumin was added in a 1:1 volume ratio. The solution was stirred at 25°C for 20 minutes and then stirred at 67°C for 3 minutes and cooled. The turbidity of the test solutions thus obtained was compared with that of a solution obtained by adding 1/15M phosphate buffer solution containing 1% bovine serum albumin to 1/15M phosphate buffer solution in a 1:1 volume ratio, and the inhibition degree of heat denaturation were calculated. The results are shown in Table I.

Table 1

| Sulfur Content of Sodium Salt of Sulfate of Hydroxyethyl Starch % | Concentration of Bovine Serum Albumin in Solution for Test (W/V) % | Concentration of Sodium Salt of Sulfate of Hydroxyethyl Starch in Solution for Test (M)* | Inhibition Ratios of Heat Denaturation of Bovine Serum Albumin (%) |
| --- | --- | --- | --- |
| 1.6 | 0.5 | $3 \times 10^{-3}$ | 97.9 |
| 6.3 | " | " | 98.1 |
| 8.2 | " | " | 98.1 |
| 11.1 | " | " | 97.6 |
| 14.5 | " | " | 98.8 |
| 17.2 | " | " | 93.4 |
| Contrast (phenylbutazone) | " | $1 \times 10^{-3}$ | 88.8 |

*M; per repeating unit

As clearly shown in Table 1, products obtained in accordance with the present invention manifest good inhibitation activities of heat denaturation of bovine serum albumin.

The potent anti-inflammatory activity of the products of this invention was determined by the following assay.

Intact, male Sprague-Dawley rats, weighing about 170–200g, are randomized into groups of 10 and treatment with the test compounds begun. They were suspended in physiological saline containing a few drops of Polysorbate 80, and administered subcutaneously or intragastrically. A control group was simultaneously treated. After 1 day of compound administration, the animals were injected intradermally at the base of the tail with 0.6 mg. of dry, heat killed *Mycobacterium butyricum* suspended in 0.05 ml of paraffin oil. Administration of the test compound was continued daily for an additional 19 consecutive days with the control group being similarly treated, but for the test compound. The rats were sacrificed on the 20th day and the degree of swelling in the hind paws determined by a volume displacement apparatus or by ankle circumference measurement. Each treated group was compared statistically with the control group. A compound was rated active if it causes a significant reduction in swelling ($P<0.05$) as compared to the controls (Wilcoxon rank-sum).

The compounds of the invention also possess the ability to lower the level of cholesterol and phospholipids in rats caused by the injection of cholesterol or Triton.

The pepsin inhibition activity of the products of the invention was tested. The results are listed in Table 2. The anti-ulcer activity of the compounds of the invention is evident.

Table 2

| Sulfur Content (%) | Pepsin Inhibition Ratio* (%) |
| --- | --- |
| 17.2 (Ex. 6) | 83 |
| 13.46 (Ex. 12) | 46 |
| 15.48 (Ex. 13) | 74 |
| 11.84 (Ex. 14) | 62 |
| Hydroxyethyl Starch | 1 |

*0.30% Sulfate of hydroxyethyl starch aqueous solution (PH=1.8) 1 ml; 20 μ g pepsin aqueous solution (PH=1.8) 1 ml; 1.5% Bovine hemoglobin (PH=1.8) 1 ml, 30°C, 10 min.

Hyaluronidase inhibition activities of sulfate of hydroxyethyl starch were tested. The results are listed in Table 3. These results indicate the usefulness of the compounds of the invention as anti-lipaemic agents.

Table 3

| Sulfur Content (%) | Inhibition Ratio* (%) |
| --- | --- |
| 12.61 (Ex. 3) | 74 |
| 17.2 (Ex. 6) | 96 |
| 4.25 (Ex. 11) | 53 |
| 13.46 (Ex. 12) | 21 |
| 15.48 (Ex. 13) | 32 |
| 11.84 (Ex. 14) | 38 |

Table 3-continued

| Sulfur Content (%) | Inhibition Ratio* (%) |
|---|---|
| Hydroxyethyl Starch | 10 |

*0.16% Sulfate of hydroxyethyl starch phosphate buffer (PH=7.0) 0.25 ml; hyaluronic acid phosphate buffer (PH=5.3) 0.5 ml; Bovine serum albumin phosphate buffer (PH=3.75) 5.0 ml 38°C, 45 minutes.

The pharmaceutical compositions of the present invention may be orally or parenterally administered in association with conventional pharmaceutical solid or liquid carrier. Solid compositions for oral administration include compression tablets, pills, capsules, sugar-coated pills, granules and the like. For preparing such solid compositions, the selected sulfate of hydroxyethyl starch, which is normally the principal active ingredient, is mixed with conventional pharmaceutical carriers such as calcium carbonate, lactose, sucrose, sorbitol, mannitol, starch, amylopection, cellulose derivatives, gelatin, and the like. Wetting agents such as magnesium stearate, and polyethylene glycols may be added. Liquid compositions for oral administration include pharmaceutically acceptable emulsions, solutions, suspensions and syrups containing inert diluents such as water and liquid paraffin which are usually employed in the art. In addition to inert diluents, adjuvants such as wetting agents, suspending agents, sweeteners and aromatic flavoring agents may be employed.

For parenteral administration, the selected product may be dissolved in sterilized water for injection and the solution is filled into an ampule in the amount sufficient for injection and sealed.

Because of their wide spectrum of pharmacological activities, the products of the invention will be provided in a range of dosage unit forms in which the concentrations are varied to suit the particular condition under treatment. The physician or veterinarian can easily select the optimum dosage unit form and dosage considering such factors as age and condition of the patient and the malady under treatment.

The optimum dosage may vary with the method of administration. For example, when the compounds of the invention are utilized as anti-inflammatory agents, the daily oral administration may vary from 20 to 10,000 mg (preferably, 50 to 2,000 mg; most preferred, 500 to 2,500 mg). For parenteral administration, the daily dosage may be from 20 to 5,000 mg (preferably, 50 to 2,000 mg; most preferred, 200 to 2,000 mg).

The following non-limiting examples are given by way of illustration only.

EXAMPLE 1

7 g of hydroxyethyl starch (Degree of substitution of hydroxyethyl group = 0.60, $[\eta]_{H_2O}^{20} = 0.324$) were rapidly added to 30 ml of conc. sulfuric acid at $-25°C$ in a three neck distillation flask. The mixture was vigorously stirred at a temperature of $-25°$ to $-30°C$ for 1 hour and 35 minutes. Stirring was difficult because the mixture became more and more viscous. On completion of the reaction, the reaction mixture was poured into 500g of ice and 70g of calcium carbonate were added. To the mixture 100 ml of water were added to decrease the viscosity of the mixture. The pH value of the solution was 6. The precipitates were separated by filtration through a glass filter and washed with 370 ml of water. The filtrate and wash liquid were combined to provide a volume of 850 ml. A total of 300 ml of ethanol was added and the mixture allowed to stand overnight at 0° C. The mixture was filtered and 25g of sodium carbonate were added to adjust a pH value of the filtrate to 10.8. Sufficient acetic acid was added to adjust a pH of the solution to 7.0. The filtrate was concentrate to a volume of 100ml and 500 ml of ethanol were added to precipitate the desired product as a white precipitate. It was separated by filtration and washed with 100 ml of ethanol (twice), 100 ml of acetone and finally with 100 ml of diethyl ether. It was dried under reduced pressure to provide 13.12g of sodium salts of sulfates of hydroxyethyl starch.

Sulfur content: 8.20%, $[\eta]_{H_2O}^{30} = 0.020$

EXAMPLE 2

A total of 30 ml of conc. sulfuric acid were placed in a 3-necked distillation flask to form a paste and cooled to $-25°C$. To the sulfuric acid 10g of hydroxyethyl starch (Degree of substitution of hydroxyethyl group = 0.75, $[\eta]_{H_2O}^{20} = 0.364$) were added. The mixture was stirred at $-37°$ to $-23°C$ for 1.5 hours. The reaction mixture became viscous but smooth stirring was possible.

On completion of the reaction, the reaction mixture was poured into 500g of ice, and 60g of sodium carbonate and 150 ml of water were added to adjust pH of solution to 7.0. The precipitate was separated by filtration and washed. The filtrate and wash solution were combined to a volume of 760 ml. A total of 190 ml of ethanol was added and the solution left standing overnight at 0°C. It was filtered and to the filtrate 13 ml of an aqueous solution saturated with sodium carbonate was added to adjust the pH of the solution to 10.4. The mixture was treated in the same manner as in Example 1 to provide 12.5 of sodium salts of sulfates of hydroxyethyl starch.

Sulfur content: 8.20% $[\eta]_{H_2O}^{30} = 0.084$

EXAMPLE 3

10 g of hydroxyethyl starch (Degree of substitution of hydroxyethyl group = 0.94, $[\eta]_{H_2O}^{20} = 0.118$) were reacted with 30 ml of conc. sulfuric acid in the same manner as in Example 2. The reaction mixture was treated in the same manner as above using 60g of calcium carbonate, 18 ml of saturated aqueous sodium carbonate solution and 0.8 ml of acetic acid. Products weighed 17.7g.

The products were dissolved in a 200 ml of water and filtered through a "Diafilter" having a membrane for molecular sieve of 10,000 using 4 l of water for de-salting, and fractionation according to molecular weight. The resulting solution was concentrated to 100 ml and 500 ml of methanol were added. The resulting white precipitate was separated by filtration and washed in the same manner as above. 14.3 g of purified sodium salts of sulfates of hydroxyethyl starch were obtained.

Sulfur content: 12.61%, $[\eta]_{H_2O}^{30} = 0.058$

EXAMPLE 4

60 ml of conc. sulfuric acid were cooled to $-30°C$. It became very viscous. To the sulfuric acid, 20g of hydroxyethyl starch (Degree of substitution of hydroxyethyl group = 0.60, $[\eta]_{H_2O}^{20} = 0.324$) were added. The mixture was vigorously stirred at between $-25°$ to $-30°C$ for 1.5 hours. On completion of reaction, 200 ml of water and 1 kg of ice were added. To the mixture, 120g of sodium carbonate powder were added to adjust pH of solution to 7.4. The mixture was filtered and pH of the filtrate was adjusted to 7.1. 1.3 l of solution were put into "Diafilter" having a membrane for molecular sieve of 10,000 and concentrated. The material in the filter was washed with 12 l of water. The solution thus obtained was adjusted to 100 ml. To the solution 500 ml of methanol were added and the precipitate separated by decantation centrifugation, and filtration and dried. The products (sodium salts of sulfates of hydroxyethyl starch) weighed 13.8g.

Sulfur content: 14.45%, $[\eta]_{H_2O}^{30} = 0.067$

EXAMPLE 5

50 ml of 60% (by weight) sulfuric acid were placed in a three neck flask and cooled to 0°C. To the sulfuric acid 10g of the hydroxyethyl starch used in Example 4 were added. The mixture was stirred at 0°C for 3 hours. On completion of reaction, the reaction mixture was poured into 500g of ice and 70g of sodium carbonate were added to adjust pH to 8.8. The pH was then adjusted to 7.1 with acetic acid. The obtained 600 ml of solution were put into "Diafilter" as used above and materials were washed with 6 l of water. The filtrate thus obtained was concentrated to 100 ml solution. To the solution 500 ml of methanol were added and the resulting mixture treated in the same manner as in Example 4. The obtained products (sodium salts of sulfates of hydroxyethyl starch) weighed 7.4g.

Sulfur content: 1.56%, $[\eta]_{H_2O}^{30} = 0.18$

EXAMPLE 6

75 ml of pyridine were placed in a three neck flask and cooled to −10°C and 5.4 ml of chlorosulfonic acid were slowly added at between 5° to −10°C. After addition of the chlorosulfonic acid, to the solution 9g of the same hydroxyethyl starch used in Example 3 were added. The mixture was stirred for 45 minutes in a water bath of 70°C. The reaction mixture remained fluid and produced only a small amount of precipitate. On completion of a reaction 100 ml of water were added followed by 875 ml of methanol and 40 ml of 20% aqueous sodium acetate solution to produce a white precipitate which was separated by filtration, washed and dried. Products (sodium salts of sulfate of hydroxyethyl starch) weighed 8.1g.

Sulfur content: 17.2%, $[\eta]_{H_2O}^{30} = 0.034$

EXAMPLE 7

1 g of sodium salts of sulfate of hydroxyethyl starch (Sulfur content = 13.17%) were dissolved in a 10 ml of water, and further 3.5 ml of methanol were added.

0.79% of AlCl$_3$.6H$_2$O were dissolved in 4 ml of water and to the solution 1.6g of 7% NH$_3$ aqueous solution were slowly added. Basic aluminum chloride aqueous solution was produced. This solution was added to the above mentioned sulfuric acid ester sodium salt of hydroxyethyl starch solution with stirring, and stirring was continued at 25°C for 3.5 hours. The resulting precipitate was separated and dispersed in 10 ml of water to which 5 ml of methanol were added. The precipitate was separated, washed with alcohol and dried at under 80°C. The aluminium salts of sulfates of hydroxyethyl starch thus obtained weighed 0.83g.

EXAMPLE 8

1 g of sodium salts of sulfate of hydroxyethyl starch (Sulfur content = 13.17%) was dissolved in 50 ml of 50% aqueous glycerine solution.

2.5 g of Bi(NO$_3$)$_3$.5H$_2$O were dissolved in 25 ml of water. This solution was added to the above mentioned sulfuric acid ester sodium salt of hydroxyethyl starch solution. The pH of such solution was adjusted to 4.5 and the resulting precipitate separated by centrifugation and dispersed in 10 ml of water. The precipitate was separated, washed with alcohol and dried. The bismuth complex of the sulfates of hydroxyethyl starch which was obtained weighed 0.98g.

EXAMPLE 9

1 g of sodium salt of sulfate of hydroxyethyl starch (Sulfur content = 13.17%) was dissolved in 20 ml of water and to the solution a cation exchange resin was added. The mixture was stirred at a room temperature for 5 hours to convert the salt form to the free form of sulfuric acid ester of hydroxyethyl starch and to the mixture 400 mg of ferrous sulfate were added with stirring. The solution thus obtained was passed through an anion exchange resin column. The effluent was freeze-dried. 0.78g of ferrous compound of sulfate of hydroxyethyl starch were obtained.

EXAMPLE 10

Example 1 was repeated and the 850 ml solution obtained by combining the filtrate and the wash solution was mixed with 300 ml of ethanol. The mixture was allowed to stand overnight. After filtration of the mixture, the filtrate was concentrated by "Diafilter" having membrane for molecular sieve of 10,000. The volume of the solution was concentrated to 100 ml. After freeze-drying, 12.81g of calcium salts of sulfates of hydroxyethyl starch were obtained.

EXAMPLE 11

8 ml of chlorosulfonic acid were added dropwise to 420 ml of pyridine at below 10°C. The precipitated pyridinium salt of chlorosulfonic acid was melted with heat. To the melted salt, 50g of hydroxyethyl starch (Degree of substitution of hydroxyethyl group = 0.920) were added in small portions. The mixture was stirred at 70°C for 45 minutes and 500 ml of water were added to stop the reaction. Acetone was added to the mixture in a ratio of 2 l of acetone per 1 l of the aqueous solution. A large amount of an oily precipitate was produced and the supernatant liquid was removed. Water was added to the oily precipitate in a ratio of 400 ml of water per 100 ml of precipitate. The pH of the solution was 5.58. The mixture was neutralized with 48 ml of a saturated aqueous solution of Na$_2$CO$_3$ to a pH of 7.72. Ethanol was added to the solution in the ratio of 1.2 l of ethanol per 600 ml of solution to form a precipitate, and the mixture was left standing overnight at room temperature.

The supernatant was separated from the mixture and ethanol was added to harden the precipitate. The precipitate was powdered in a Waring blender. The mixture was filtered and the precipitate washed successively with ethanol and ether. 38.2 g of sodium salts of sulfates of hydroxyethyl starch were obtained.

35 g of the thus obtained sulfate of hydroxyethyl starch were dissolved in 250 ml of water and the solution was placed in a "Diafilter" having a membrane for molecular sieve of 30,000, and washed with water, de-salted and concentrated, as in the previous examples. 250 ml of inside solution were freeze-dried and 25.3g of sodium salts of sulfates of hydroxyethyl starch.

Sulfur content: 4.25% $[\eta]_{H_2O}^{30} = 0.42$

EXAMPLE 12

150 ml of conc. sulfuric acid were cooled to form a paste. To the sulfuric acid 50g of hydroxyethyl starch (Degree of substitution of hydroxyethyl group = 0.92) were added portionwise over a period of 15 minutes at −25°C, and the mixture was stirred for an additional 15 minutes as it warmed to 0°C. The mixture was stirred for an additional 4 hours. During this period the color became brown.

The mixture and 180 ml of cooled ether were mixed at −30°C. The brown colored precipitate was separated by filtration through a glass filter and washed with cooled ether. The precipitate was dissolved in 200 ml of water, and ether phase removed. The pH of a brown solution was 0.21. The pH of the solution was adjusted with 46 ml of 20% NaOH aqueous solution to 7.06. To about 350 ml of the neutralized solution, 1.2 l of acetone were added. The initial oily precipitate became flaky on standing. The supernatant was removed and ethanol was added to the precipitate. The powdered precipitate was separated by filtration, washed successively with ethanol and ether, and dried. The resulting white powders of sodium salts of sulfates of hydroxyethyl starch weighed 42.4g.

Sulfur content: 13.46%, $[\eta]_{H_2O}^{30} = 0.038$

EXAMPLE 13

Using 150 ml of conc. sulfuric acid, 50 g of hydroxyethyl starch (Degree of substitution of hydroxyethyl group = 0.92), a reaction was carried out and the reaction mixture was treated in the same manner as in Example 12. 67.8 g of brown colored sodium salts of sulfates of hydroxyethyl starch were obtained.

Sulfur content: 15.48%, $[\eta]_{H_2O}^{30} = 0.032$

EXAMPLE 14

Using 75 ml of conc. sulfuric acid, 50g of hydroxyethyl starch (Degree of substitution of hydroxyethyl group = 0.92), a reaction was carried out and the reaction mixture was treated in the same manner as in Example 12. 35.2g of brown colored sodium salts of sulfates of hydroxyethyl starch were obtained.

Sulfur content: 11.84%, $[\eta]_{H_2O}^{30} = 0.040$

EXAMPLE 15

100g sodium sulfate of hydroxyethyl starch obtained as in Example 12 were added to 1,000 ml distilled water. A clear solution was obtained.

In the same manner, sodium sulfate aqueous solutions of various concentrations were prepared for oral or parenteral administration.

EXAMPLE 16

10 kg of sodium sulfate salts of hydroxyethyl starch obtained by the procedure of Example 12, 7.5 kg corn starch, 4 kg talc, and 0.13 kg magnesium stearate were thoroughly mixed, and 50,000 capsules were charged with equal amounts of the mixture in the usual manner. The capsules were employed as anti-inflammatory agents by oral administration of one to two capsules every 6 to 12 hours.

EXAMPLE 17

10 kg of sodium sulfate salts of hydroxyethyl starch obtained by the procedure of Example 12, 2.5 kg lactose, 1.5 kg corn starch, 0.15 kg magnesium stearate, and 0.06 kg light liquid petrolatum were thoroughly mixed and slugged. The slugs were forced through a screen, and the resulting granules were then compressed into 100,000 tablets, each tablet containing 100 mg of the active ingredient.

EXAMPLE 18

A sterile aqueous solution for intramuscular injection was prepared from 100g of sodium sulfate salts of hydroxyethyl starch obtained by the procedure of Example 13 and 1,000 ml water for injection. The active compound was dissolved in the water, and sufficient sodium hydroxide was added to form a solution with a pH of 7.2. The solution was sterilized by filtration. 1 ml batches of the solution were filled into sterile vials and lyophilized, whereupon the vials were sealed. Immediately prior to use, sufficient sterile water for injection to make 1 ml of solution was added to each vial.

EXAMPLE 19

Preparation of tablets

| Prescription: | Sodium sulfate of hydroxyethyl starch obtained as in Example 12 | 2g |
|---|---|---|
| | Lactose | 0.4g |
| | Starch | 0.48g |
| | Talc | 0.1g |
| | Magnesium stearate | 0.02g |

The whole is made into 20 tablets by means of a 10 mm. — deep cup punch.

The tablets were coated in the conventional manner.

EXAMPLE 20

Sodium sulfate salts of hydroxyethyl starch obtained by the procedure of Example 13, were dissolved in isotonic sodium chloride solution. The solution was sterilized by passage through a microporous filter, and single doses of varying strength were injected intraperitoneally (0.5 ml solution per 10g of body weight in a standard toxicity test into male mice weighing 16.0–20.0g each. The mean lethal dosage ($LD_{50}$) was determined 2 weeks after the injection according to Litchfield-Wilcoxon method. The result obtained is $LD_{50}=4.61$ g/kg.

EXAMPLE 21

Sodium sulfate salts of hydroxyethyl starch obtained as described above were dissolved in distilled water. The solution was sterilized by passage through a microporous filter, and single doses of varying strength were administered orally (0.5 ml solution per 10g of body weight) in a standard toxicity test to male mice weighing 17.0–20.0g each. The mean lethal dosage ($LD_{50}$) was determined two weeks after the injection according to Litchfield-Wilcoxon method. The result obtained is $LD_{50} > 10.0$ g/kg.

What is claimed is:

1. Compounds selected from the group consisting of sulfates of hydroxyethyl starch, metallic salts of sulfates of hydroxyethyl starch and metallic complexes of sulfates of hydroxyethyl starch, said compounds having an average molecular weight in the range from 1,000 to 200,000; a degree of hydroxyethyl substitution of from 0.2 to 1.2 per anhydrous glucose unit, a sulfur content of from 2 to 18% by weight and an intrinsic viscosity of from 0.02 to 0.5 at 30°C in water.

2. Processes for the production of products of claim 1 which comprises 1. reacting hydroxyethyl starch with over 69% sulfuric acid at from −30° to 0°C for from 20 minutes to 4 hours, the weight of said hydroxyethyl starch being from 20 g to 50 g per 100 ml of sulfuric acid; or with chlorosulfonic acid in pyridine at from 50° to 70°C for from 20 minutes to 2 hours, the amount of chlorosulfonic acid being from 0.5 to 3 mole per anhydrous glucose unit of hydroxyethyl starch, there being 3 to 10 ml of pyridine per gram of hydroxyethyl starch, 2. adding a water miscible organic solvent to precipitate the desired product.

3. A compound of claim 1, wherein metals of said metallic salts and complexes thereof are sodium, potassium, lithium, magnesium, calcium, barium, aluminum, iron and bismuth.

* * * * *